United States Patent [19]

Weider et al.

[11] Patent Number: 5,110,895
[45] Date of Patent: May 5, 1992

[54] POLYESTER AND POLYESTER CARBONATE FROM TEREPHTHALIC OR ISOPHTHALIC ACID, PHOSGENE AND PHENOLS WITH HEAT RESISTANCE AND LIGHT STABILITY

[75] Inventors: Richard Weider, Leverkusen; Dieter Arlt, Cologne; Christian Leuschke, Dormagen; Thomas Scholl, Meerbusch, all of Fed. Rep. of Germany

[73] Assignee: Bayer Aktiengesellschaft, Leverkusen, Fed. Rep. of Germany

[21] Appl. No.: 566,172

[22] Filed: Aug. 13, 1990

[30] Foreign Application Priority Data

Aug. 23, 1989 [DE] Fed. Rep. of Germany ....... 3927771

[51] Int. Cl.$^5$ .................. C08G 63/00; C08G 63/02; C08G 64/00
[52] U.S. Cl. .................. 528/176; 528/125; 528/171; 528/194; 528/196
[58] Field of Search ............ 528/176, 196, 194, 125, 528/171

[56] References Cited

PUBLICATIONS

*Encyclopedia of Polymer Science* vol. 11 "Peroxy Compounds to Polyesters" p. 691.
*Phys. Props. Polymers* vol. 105, 1986, 79678v, Prevorsek, D. C.
*Chemical Abstracts* vol 67, 1967 "Properties of polyarylates from 9,9-bis(4-hydroxy-phenyl)fluorene" 54496t, V. V. Korshak, et al.

*Primary Examiner*—Harold D. Anderson
*Assistant Examiner*—T. Mosley
*Attorney, Agent, or Firm*—Connolly & Hutz

[57] ABSTRACT

Polyester and polyester carbonates corresponding to the following formula

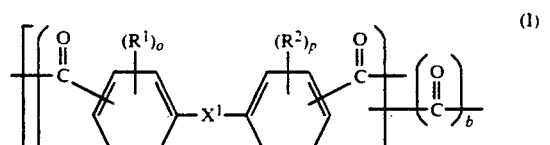

in which $R^1$ to $R^4$, o to r, n, a and b and also $X^1$ and $Y^1$ are as defined in the specification,
may be obtained by interfacial condensation from bisphenols corresponding to the following formula.

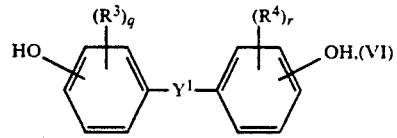

aromatic dicarboxylic acid chlorides corresponding to the following formula

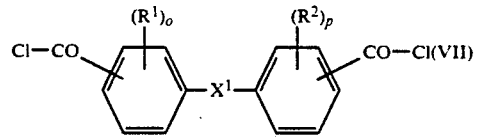

and phosgene.

The new polyesters and polyester carbonates combine outstanding heat resistance and light stability. They may be used both as thermoplastic materials as such or as constituents of polymer blends or even as UV (light) stabilizers or as UV (light)-stabilizing coatings. Accordingly, they have degrees of polycondensation n in the range from 2 to 100.

9 Claims, No Drawings

POLYESTER AND POLYESTER CARBONATE FROM TEREPHTHALIC OR ISOPHTHALIC ACID, PHOSGENE AND PHENOLS WITH HEAT RESISTANCE AND LIGHT STABILITY

This invention relates to new aromatic polyesters and polyester carbonates which are distinguished by their high heat resistance and light stability.

Aromatic polyesters and polyester carbonates of terephthalic or isophthalic acid, phosgene and phenols obtainable on an industrial scale have long been known and, by virtue of their heat resistance, are used for a variety of applications. Unfortunately, a disadvantage of these polymers is their poor stability to the effect of light, particularly to the effect of the UV component of light. Even stabilized types rapidly turn yellow under the effect of light. Accordingly, there was a need to overcome the highly restricting disadvantage of inadequate light stability.

New polyesters and polyester carbonates have been found which correspond to the following formula

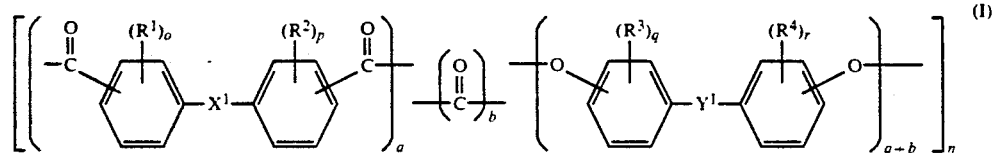

in which
R$^1$, R$^2$, R$^3$ and R$^4$ independently of one another represent linear or branched C$_{1-4}$ alkyl, linear or branched C$_{1-4}$ alkoxy or chlorine,
o, p, q and r independently of one another assume one of the values zero, one, two, three or four,
n indicates degrees of polycondensation of 2 to 100,
a and b indicate the numbers of mols of the dicarboxylate component or the carbonate component and a+b indicates the number of mols of the bisphenolate component and the term 100·a/(a+b) may assume values of 5 to 100,
X$^1$ represents linear or branched C$_{1-12}$ alkylene, linear or branched C$_{2-12}$ alkylidene, C$_{5-15}$ (alkyl) cycloalkylene, C$_{5-15}$ (alkyl) cycloalkylidene or one of the groups

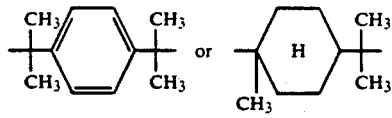

and
Y$^1$ is a single bond, linear or branched C$_{1-12}$ alkylene, linear or branched C$_{2-12}$ alkylidene, C$_{5-15}$ (alkyl) cycloalkylene, C$_{5-15}$ (alkyl) cycloalkylidene, —O—, —S—, —SO$_2$—, —CO— or one of the groups

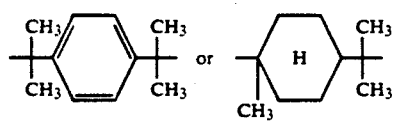

at least one of the indices o, p, q and r being different from zero or the term 100·a/(a+b) assuming values of 5 to 99.9 where X$^1$ represents methylene, linear C$_{2-7}$ alkylidene or 1,1-dimethyl-2,2-propylidene. Examples of C$_{1-4}$ alkyl are methyl, ethyl, propyl, isopropyl, butyl, isobutyl or tert.-butyl, preferably methyl or ethyl and, more preferably, methyl.

Examples of C$_{1-4}$ alkoxy are methoxy, ethoxy, propoxy, isopropoxy, butoxy, isobutoxy, tert.-butoxy, preferably methoxy or ethoxy and, more preferably, methoxy.

The indices o, p, q and r independently of one another represent one of the values zero, one, two, three or four, preferably zero, one or two; where these indices assume the value zero, there is a hydrogen atom instead of a substituent.

Examples of C$_{1-12}$ alkylene are methylene, dimethylene, trimethylene, tetramethylene, pentamethylene, hexamethylene, etc. to dodecamethylene. With the exception of the methylene group, the two bonds of the alkylene group start from different carbon atoms; alkylene may be attached to the two adjacent aromatic rings by an α,ω-bond (linear alkylene) or by any other bond (branched alkylene).

Examples of C$_{2-12}$ alkylidene are ethylidene, propylidene, etc. in the same way as alkylene, except that the two bonds to the adjacent aromatic rings always start from the same carbon atom. The higher alkylidene groups may also be branched as known to the expert. Preferred alkylidene contains 3 to 12 carbon atoms and precludes 1,1-alkylidene groups. Particularly preferred alkylidene contains 3 to 8 carbon atoms and preclude the 1,1-alkylidene groups.

C$_{5-15}$ (alkyl) cycloalkylene is a two-bond cycloaliphatic group in which the bonds start from two different carbon atoms; cycloaliphatic groups such as these may be alkyl-substituted. Examples are cyclopentylene, cyclohexylene, cycloheptylene, cyclooctylene, etc., methyl-, dimethyl-, trimethyl-substituted cyclopentylene, methyl-, dimethyl-, trimethyl-substituted cyclohexylene, corresponding cycloaliphatic two-bond groups substituted one or more times by ethyl, propyl or butyl.

C$_{5-15}$ (alkyl) cycloalkylidene resembles the C$_{5-15}$ (alkyl) cycloalkylene groups just described, except that the two bonds always start from one carbon atom. Examples are cyclopentylidene, cyclohexylidene, cycloheptylidene, etc., and the corresponding cycloalkylidene groups substituted one or more times by methyl, ethyl, propyl or butyl.

The indices a and b represent the number of mols of the dicarboxylate component or carbonate component in the polyesters and polyester carbonates according to the invention; the sum a+b indicates the number of mols of the bisphenolate component. The term 100·a/(a+b) indicates the quantity in mol-% in which the dicarboxylate component is present in the polyesters and polyester carbonates according to the invention. This term may assume values of 5 to 100, preferably 50 to 100 and, more preferably, 80 to 100. In the cases described above, this term assumes values of 5 to 99.9, preferably 5 to 99.5, more preferably 50 to 99.5 and, most preferably, 80 to 99.5. The polyesters and polyester carbonates according to the invention may also contain several of the dicarboxylate components corresponding to the above formula and/or several of the bisphenolate components corresponding to the above formula within the limits of these mol percentages, in other words various dicarboxylate components and/or various bisphenolate components may be present in one and the same macromolecule. This applies both to dicarboxylate components or bisphenolate components which differ in the substituents $R^1$, $R^2$ and $X^1$ or $R^3$, $R^4$ and $Y^1$ and in the indices o and p and q or r, and to those which differ from one another in the positions of the carboxylate-CO groups and in the positions of the bisphenolate-O atoms. For example, the two carboxylate-CO groups may both be in the p-position or m-position or one of the two carboxylate —CO groups may be in the p-position and one in the m-position to the linkage $X^1$. However, a mixture of these position isomers may also be used, as known in the prior art, for example from the simultaneous use of terephthalic and isophthalic acid in polyesters. The same applies to the bisphenolate component.

The polyesters and polyester carbonates according to the invention preferably contain one or more dicarboxylate components corresponding to the following formula

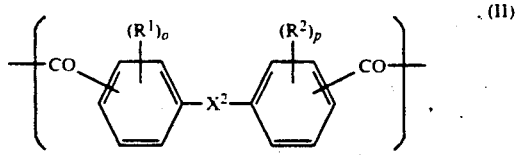

(II)

in which
  $R^1$, $R^2$, o and p are as defined above and
  $X^2$ represents linear or branched $C_{3-12}$ alkylidene except for the 1,1-alkylidene groups, $C_{5-10}$ (alkyl) cycloalkylene, $C_{5-10}$ (alkyl) cycloalkylidene or one of the groups

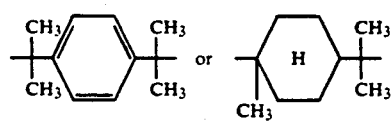

at least one of the indices o and p or one of the indices q and r of the bisphenolate component being different from zero or the term $100 \cdot a/(a+b)$ assuming values of 5 to 99.5 where $X^2$ represents linear $C_{3-7}$ alkylidene or 1,1-dimethyl-2,2-propylidene.

In a particularly preferred embodiment, the polyesters and polyester carbonates contain one or more dicarboxylate components corresponding to the following formula

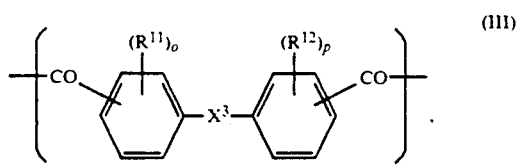

(III)

in which
  $R^{11}$ and $R^{12}$ independently of one another represent methyl, ethyl or chlorine,
  o and p are as defined above and
  $X^3$ represents linear or branched $C_{3-8}$ alkylidene except for the 1,1-alkylidene groups, $C_{5-10}$ (alkyl) cycloalkylene, $C_{5-10}$ (alkyl) cycloalkylidene or one of the groups

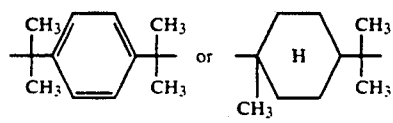

at least one of the indices o and p or one of the indices q and r of the bisphenolate component being different from zero or the term $100 \cdot a/(a+b)$ assuming values of 5 to 99.9 where $X^3$ represents linear $C_{3-7}$ alkylidene or 1,1-dimethyl-2,2-propylidene.

Other preferred polyesters and polyester carbonates according to the invention are those in which, instead of the indices o and p, the indices o' and p' independently of one another assume a value of zero, one or two.

Other preferred polyesters and polyester carbonates according to the invention contain one or more bisphenolate components corresponding to the following formula

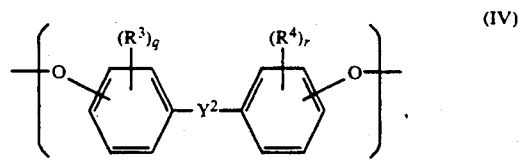

(IV)

in which
  $R^3$, $R^4$, q and r are as defined above and
  $Y^2$ represents linear or branched $C_{3-8}$ alkylidene except for the 1,1-alkylidene groups, $C_{5-10}$ (alkyl) cycloalkylene, $C_{5-10}$ (alkyl) cycloalkylidene or one of the groups

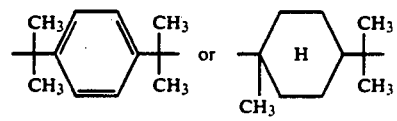

Other particularly preferred polyesters and polyester carbonates according to the invention contain one or more bisphenolate components corresponding to the following formula

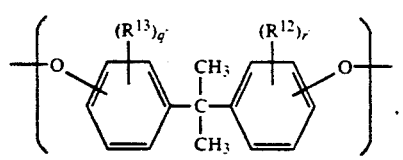

(V)

in which
R[13] and R[14] independently of one another represent methyl, ethyl or chlorine and
q' and r' independently of one another assume one of the values zero, one or two.

The present invention also relates to a process for the production of polyesters and polyester carbonates corresponding to formula (I), characterized in that a+b mols of one or more bisphenols corresponding to the following formula

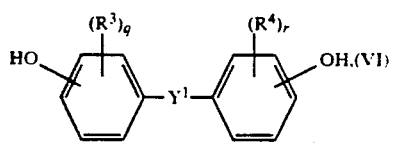

(VI)

in which
R[3], R[4], Y[1], q and r are as defined above, are reacted with a mols of one or more aromatic dicarboxylic chlorides corresponding to the following formula

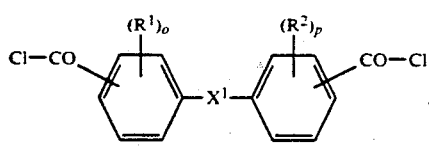

(VII)

in which
R[1], R[2], X[1], o and p are as defined above,
and b mols phosgene (b assuming the value zero in the case of the pure polyesters) by the interfacial condensation method.

Bisphenols for the process according to the invention may be produced by basically known processes. For example, 2,2-bis-(p-hydroxyphenyl)-propane (bisphenol A) may be prepared from phenol and acetone in the presence of acidic catalysts.

Dicarboxylic acid chlorides corresponding to formula (VII) may be obtained from the parent dicarboxylic acids by known methods, for example by reaction with thionyl chloride. Suitable carboxylic acids are, for example, 2,2-bis-(4-carboxyphenyl)-propane, 2,2-bis-(3-carboxyphenyl)-propane, 2-(4-carboxyphenyl)-2-(3-carboxyphenyl)-propane, 2,2-bis-(4-carboxyphenyl)-4-methylpentane 3,3-bis-(4-carboxyphenyl)-5-methylheptane, 1,3-bis-(4-carboxyphenyl)-cyclopentane, 1,3-bis-(4-carboxyphenyl)-cyclohexane, 1,4-bis-(4-carboxyphenyl)-cyclohexane, 2,2-bis-(3,5-dimethyl-4-carboxyphenyl)-propane, 1,1-bis-(4-carboxyphenyl)-cyclopentane, 1,1-bis-(4-carboxyphenyl)-cyclohexane, 1,1-bis-(4-carboxyphenyl)-3-methylcyclohexane, 1,1-bis-(4-carboxyphenyl)-3,5,5-trimethylcyclohexane, and others.

The parent dicarboxylic acids may be obtained, for example, by
a) reaction of a bisphenol corresponding to the following formula

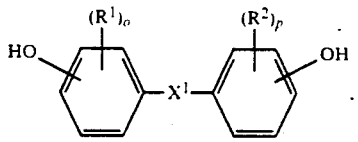

(VIII)

in which
R[1], R[2], X[1], o and p are as defined above,
with sulfonic acid derivatives corresponding to the formula $$R^5-SO_2-R^6 \quad (IX)$$

in which
R[5] represents linear or branched, open-chain or cyclic $C_{1-12}$ alkyl, $C_{6-12}$ aryl or $C_{7-10}$ aralkyl and
R[6] represents hydroxyl, chlorine, bromine or $-O-SO_2-R^5$,
to form the bis-sulfonates (X)

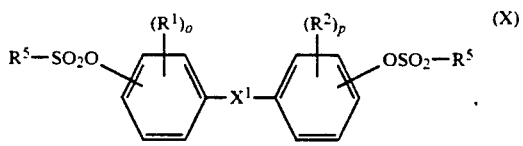

(X)

in which
R[1], R[2], R[5], X[1], o and p are as defined above,
b) hydrogenation of the bis-sulfonates obtained in dissolved form under a hydrogen pressure of 1 to 100 bar and preferably 1 to 50 bar on a supported or non-supported hydrogenation catalyst in a quantity of 1 to 10 g and preferably in a quantity of 2.5 to 5 g of hydrogenation-active component per mol bis-sulfonate to form the associated hydrocarbon (XI)

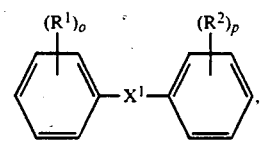

(XI)

in which
R[1], R[2], X[1], o and p are as defined above, and
c) double acylation of the hydrocarbon obtained in known manner and oxidation of the acyl groups, for example with hypochlorite solution, to carboxyl groups.

Polycondensation by the interfacial method is known in principle to the expert (cf. for example DE-OS 2 703 376, 3 000 610, 2 714 544, 2 940 024, 3 007 934). To this end, the bisphenols, dissolved in aqueous alkaline solution (preferably aqueous sodium hydroxide) in the form of their bisphenolates, are introduced into the reaction mixture with the aromatic dicarboxylic acid chlorides dissolved in water-immiscible solvents, such as methylene chloride, the polycondensation reaction taking place at the phase interface and the polymer formed being taken up by the organic solvent. This process may be carried out in the presence of catalysts, such as quaternary ammonium salts, for example tetra-(n-butyl)-ammonium bromide, triethyl benzyl ammonium bromide, decyl trimethyl ammonium bromide, tertiary amines, for example triethylamine, or emulsifiers, such as sodium dodecyl sulfate for example. In addition, the reaction is always carried out in the presence of enough alkali hydroxide to bind the hydrochloric acid formed. To control the degree of polycondensation n, the reaction is carried out in the presence of chain terminators. Preferred chain terminators for the aromatic polyesters and polyester carbonates are phenol, alkylphenols containing $C_{1-12}$ alkyl groups, halogenated phenols, hydroxydiphenyl, naphthols, chlorocarbonic acid esters of such phenolic compounds and chlorides of aromatic monocarboxylic acids, which may optionally be substituted by $C_{1-22}$ alkyl groups and halogen atoms, in quantities of 0.1 to 10 mol-% (in the case of phenols, based on diphenols; in the case of acid chlorides, based on acid dichlorides). Chlorides containing up to 22 carbon atoms are also suitable.

The reaction of the bisphenolate on the one hand with the aromatic dicarboxylic acid chloride and the phosgene on the other hand may be carried out by initially precondensing the bis-phenolate with the aromatic dicarboxylic acid chloride and then completing the condensation by introduction of phosgene or by simultaneously introducing the aromatic dicarboxylic acid chloride and the phosgene into the reaction mixture. Both block copolymers and statistical copolymers may be obtained in this way. In the production of pure polyesters, there is no need to use phosgene.

In another, less preferred embodiment, the polycondensation reaction is carried out in the melt by reaction of bisphenols corresponding to formula (VI) with $C_{1-4}$ alkyl esters of the aromatic dicarboxylic acids on which the acid chlorides (VII) are based and diphenyl carbonate with elimination of $C_{1-4}$ alkanol and phenol. In this case, too, there is no need for the reaction with diphenyl carbonate in the production of pure polyesters. In another variant, the melt process may be carried out by reaction of the acetates of the bisphenols (VI) with the free aromatic dicarboxylic acids on which the acid chlorides (VII) are based and diphenyl carbonate.

The degree of polycondensation n of the polyesters and polyester carbonates according to the invention is in the range from 2 to 100. At the upper end of this range, for example with degrees of polycondensation n of 30 to 100, preferably 40 to 90 and more preferably 50 to 80, the polyesters and polyester carbonates according to the invention are valuable thermoplastic materials which may either be used as such or as a constituent of polymer blends. As a constituent of polymer blends, they make up 0.1 to 99% by weight and preferably 5 to 80% by weight of the total weight of the polymeric materials. Other polymers to which the polyester or polyester carbonates according to the invention may be added as a blend constituent are, for example, polycarbonates, aromatic polyesters, polyethylene or polybutylene terephthalate and others.

The polyesters or polyester carbonates according to the invention are substantially colorless, transparent materials. They are distinguished by particularly high glass temperatures. The glass temperature is particularly high in cases where the pure isomeric compounds are used instead of the above-described mixtures of position isomers (para-para bond, para-meta bond or meta-meta bond of the carboxylate or phenolate groups to aromatic rings). In addition, the desired glass temperature may be established through the above-described choice of the percentage content of carbonate and ester structures in the polymers according to the invention, which has a direct effect on their heat resistance. In general, the glass temperature of the copolymers according to the invention decreases with increasing percentage content of carbonate structures. This heat resistance, which exceeds that of typical polyester carbonates of terephthalic acid/isophthalic acid and bisphenols, opens up further applications hitherto not considered possible for manmade materials. Thus, a polyester carbonate produced from bisphenol A and 2,2-bis-(4-chlorocarbonylphenyl)-propane and 2 mol-% carbonate units has a glass temperature of 220° C. whereas, for comparison, a polyester of terephthalic acid/isophthalic acid (1:1) and bisphenol A has a glass temperature of 199° C.

In addition, the polyesters and polyester carbonates according to the invention are distinguished by considerably increased light (UV) stability. As a result, the extent to which they yellow when used as a thermoplastic materials is significantly reduced, even in the event of prolonged exposure. This resistance to yellowing is also imparted to polymer blends in which the polyesters or polyester carbonates according to the invention are incorporated as a constituent or applied in the form of a surface layer. In addition, however, polyesters or polyester carbonates according to the invention having relatively low degrees of polycondensation may be incorporated as light (UV) stabilizers by standard mixing or compounding techniques. The degree of polycondensation for this particular application is, for example, 5 to 50 and preferably 10 to 40. Light (UV) stabilizers such as these are added to other polymers in a quantity of 0.1 to 30% by weight and preferably in a quantity of 0.1 to 10% by weight, based on the total weight of the stabilized polymeric materials. Examples of polymers such as these to be stabilized include polycarbonate, polyethylene or polybutylene terephthalate, aromatic polyesters, polyamide, polyurethane, polyphenylene oxide and sulfide and others.

Finally, the polyesters or polyester carbonates according to the invention may be used in the form of paints for the surface light (UV) stabilization of polymeric materials. The degree of polycondensation n for this particular application is, for example, 2 to 40, preferably 5 to 30 and more preferably 5 to 20. The corresponding molecular weights are 1,000 to 20,000, preferably 2,500 to 15,000 and more preferably 2,500 to 10,000 where the molecular weight of the recurring polycondensation unit of formula (I) is put, for example, at 500; these molecular weights are dependent in known manner on the scope of the substituents and the linking elements of the polymers.

The light (UV) stability of the polyesters or polyester carbonates according to the invention is not affected by the isomer distribution of the bond in the bisphenolate component or the dicarboxylate component or, more particularly, by the isomer distribution of the bond in the dicarboxylate component.

Another surprising property of the new polyesters and polyester carbonates is their extremely high refractive index for thermoplastic materials. The already mentioned polyester carbonate of bisphenol A and 2,2-bis-(4-chlorocarbonylphenyl)-propane and 2 mol-% carbonate units has a refractive index of, for example, 1.611.

This opens up a large number of other new potential applications in the light and optical fields, for example for the production of lenses, corrective spectacles, etc., which broaden the potential applications of hitherto known aromatic polyester carbonates.

EXAMPLES

The Examples relate to polyester carbonates or polyesters based on 2,2-bis-(4-hydroxyphenyl)-propane (bisphenol A), the dichloride of the dicarboxylic acids mentioned and phosgene, which were obtained by the interfacial method (methylene chloride/aqueous NaOH) using tetra-n-butyl ammonium bromide as phase transfer catalyst and p-tert.-butylphenol as chain terminator. Precondensation with the acid chloride was carried out first, the condensation then being completed with phosgene. The ageing properties were determined on unstabilized material.

1. Polyester carbonate of 2,2-bis(4-chlorocarbonylphenyl)-propane (A):

| Composition according to general formula (I): |
| --- |
| a:b = 98:2 (acid chloride: $COCl_2$) |
| glass temperature: 220° C. |
| molecular weights $M_w$ 28,350, $M_n$ 10,700 |
| yellowness index (2 mm): 5.5 |
| refractive index: 1.611. |

2. Polyester carbonate of a mixture (20:60:20) of the three possible position-isomeric 2,2-bis-(4(3)-chlorocarbonylphenyl)-propanes (B):

| Composition according to general formula (I): |
| --- |
| a:b = 98:2 |
| glass temperature: 171° C. |
| molecular weights $M_w$ 28,420, $M_n$ 10,360 |
| yellowness index (2 mm): 5.3 |
| refractive index: 1.608. |

3. Polyester of 1,1-bis-(4-chlorocarbonyl)-cyclohexane (C):

| Composition according to general formula (I): |
| --- |
| a:b = 100:0 |
| glass temperature: 191.5° C. |
| molecular weights $M_w$ 20,150, $M_n$ 8,300 |
| yellowness index (2 mm): 6.1 |

4. The greatly improved light stability is demonstrated in the following weathering test (xenon weatherometer, 500 and 2,000 hours; unstabilized materials): The results are expressed as the increase in the yellowness index (Δ-YI) of 2 mm plates:

|  | Δ-YI 500 h | Δ-YI 2,000 h |
| --- | --- | --- |
| Polyester carbonate A | 4 | 16 |
| Polyester carbonate B | 4 | 16 |
| For comparison: APEC 80, stabilized* | 12 | >40 |

*APEC 80 = polyester carbonate of bisphenol A, terephthalic/isophthalic dichloride (80 mol %), phosgene (20 mol %)
a:b = 80:20

5. By using other biphenols instead of bisphenol A in the above Examples, polyesters may be obtained in otherwise the same way from, for example, 2,2-bis-(4-chlorocarbonylphenyl)-propane and 1,1-bis-(4-hydroxyphenyl)-3,3,5-trimethyl cyclohexane.

| Composition according to general formula (I): |
| --- |
| a:b = 100:0 |
| glass temperature: 201° C. |
| molecular weights $M_w$ 15,900, $M_n$ 6,100 |
| yellowness index (2 mm): 5.4 |

6. The use of the polyester carbonate of Example 1 as a light (UV) stabilizer in the form of a surface layer on bisphenol A polycarbonate:

Thickness of the surface layer: 30 μm

The permeability of the surface layer to UV light having a wavelength of 300 and 380 nm was evaluated before and after exposure (72 h) at 300 nm (UV transmitted-light photograph):

|  | Before exposure | | After exposure | |
| --- | --- | --- | --- | --- |
|  | 300 nm | 380 nm | 300 nm | 380 nm |
| Surface layer: | Transparent | | Opaque | |
| Polycarbonate: | Transparent | | Transparent | |

The absorption coefficient of the surface layer of the same sample at 350 nm was measured during exposure to UV light:

| Time: | 0 | 2 | 10 | 20 | 30 | 40 mins. |
| --- | --- | --- | --- | --- | --- | --- |
| Abs. coeff.: | 0.15 | 0.7 | 1.4 | 1.7 | 1.8 | 2 |

It is clear that the surface layer completely absorbs the UV light after only a short time and protects the underlying material against UV light.

We claim:

1. Polyester or polyester carbonate having repeating units of the formulae (I), (II) and (III)

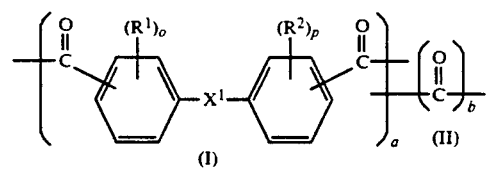

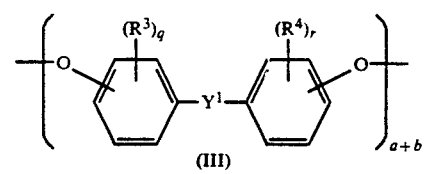

in which $R^1$, $R^2$, $R^3$ and $R^4$ independently of one another represent linear or branched $C_{1-4}$ alkyl, linear or branched $C_{1-4}$ alkoxy or chlorine, o, p, q and r independently of one another represent zero, one, two, three or four, a and b indicate the numbers of mols of the dicarboxylate component or the carbonate component and a+b indicates the number of mols of the bisphenolate component and the term 100·a/(a+b) has a value of 5 to 100, $X^1$ represents linear or branched $C_{1-12}$ alkylene, linear or branched $C_{2-12}$ alkylidene, $C_{5-15}$ (alkyl) cycloalkylene, $C_{5-15}$ (alkyl) cycloalkylidene or one of the groups

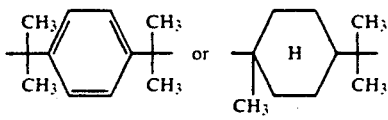

and

Y$^1$ is a single bond or Y$^1$ is linear or branched C$_{1-12}$ alkylene, linear or branched C$_{2-12}$ alkylidene, C$_{5-15}$ (alkyl) cycloalkylene C$_{5-15}$ (alkyl) cycloalkylidene, —O—, —S—, —SO$_2$—, —CO— or one of the groups

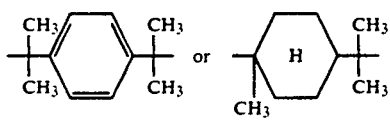

at least one of the indices o, p, q and r being different from zero or the term 100·a/(a+b) is from 5 to 99.9 where X$^1$ represents methylene, linear C$_{2-7}$ alkylidene or 1,1-dimethyl-2,2-propylidene, and wherein the degree of polymerization is from 2 to 100 repeating units of (I), (II) and (III).

2. Polyester or polyester carbonate as claimed in claim 1 which contain one or more dicarboxylate monomeric units corresponding to the formula

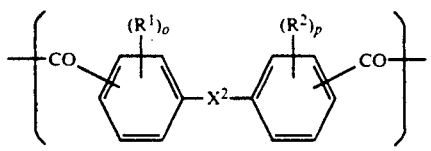

in which

R$^1$ and R$^2$ independently of one another represent linear or branched C$_{1-4}$ alkyl, linear or branched C$_{1-4}$ alkoxy or chlorine, o and p independently of one another represent zero, one, two, three or four and X$^2$ represents linear or branched C$_{3-12}$ alkylidene with the exception of 1,1-alkylidene groups, C$_{5-10}$ (alkyl) cycloalkylene, C$_{5-10}$ (alkyl) cycloalkylidene or one of the groups

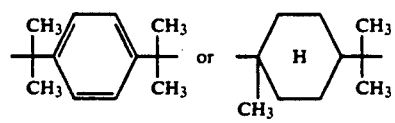

and wherein at least one of o and p or one of q and r of the bisphenolate component is different from zero or the term 100·a/(a+b) having a value of 5 to 99.5 where X$^2$ represents linear C$_{3-7}$ alkylidene or 1,1-dimethyl-2,2-propylidene.

3. Polyester or polyester carbonate as claimed in claim 2 which contain one or more dicarboxylate monomeric units corresponding to the formula

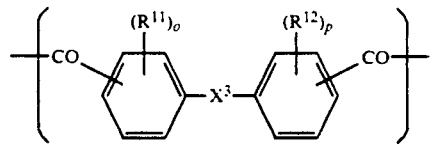

in which

R$^{11}$ and R$^{12}$ independently of one another represent methyl, ethyl or chlorine, o and p independently of one another have the value zero, one, two, three or four and X$^3$ represents linear or branched C$_{3-8}$ alkylidene with the exception of the 1,1-alkylidene groups, C$_{5-10}$ (alkyl) cycloalkylene, C$_{5-10}$ (alkyl) cycloalkylidene or one of the groups

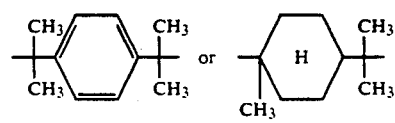

and wherein at least one of o and p or one of q and r of the bisphenolate component is different from zero or the term 100·a/(a+b) having a value of 5 to 99.9 where X$^3$ represents linear C$_{3-7}$ alkylidene or 1,1-dimethyl-2,2-propylidene.

4. Polyester or polyester carbonate ad claimed in claim 3 wherein o and p independently of one another, represent zero, one or two.

5. Polyester or polyester carbonate as claimed in claim 1 which contain one or more bisphenolate monomeric units corresponding to the formula

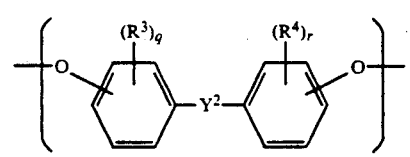

in which

R$^3$ and R$^4$ independently of one another represent linear or branched C$_{1-4}$ alkyl, linear or branched C$_{1-4}$ alkoxy or chlorine, q and r independently of one another have the value zero, one, two, three or four and Y$^2$ represents linear or branched C$_{3-8}$ alkylidene with the exception of the 1,1-alkylidene groups, C$_{5-10}$ (alkyl) cycloalkylene, C$_{5-10}$ (alkyl) cycloalkylidene or one of the groups

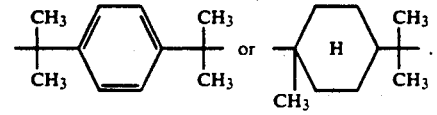

6. Polyester or polyester carbonate as claimed in claim 5 which contain one or more bisphenolate monomeric units corresponding to the formula

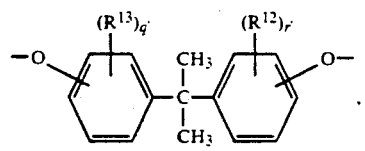

in which
R[13] and R[14] independently of one another represent methyl, ethyl or chlorine and
q' and r' independently of one another have the value zero, one or two.

7. Polyester or polyester carbonate as claimed in claim 1 wherein the term 100·a/(a+b) has a value of 50 to 100.

8. A process for the production of polyesters or polyester carbonate claimed in claim 1 which process comprises reacting a+b mols of at least one bisphenol of the formula

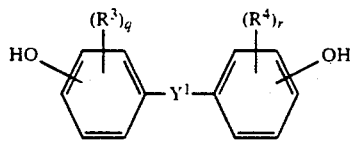

with a mols of at least one aromatic dicarboxylic acid chloride of the formula

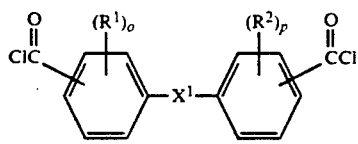

and b mols phosgene by the interfacial method.

9. A lens which comprises the polyester or polyester carbonate claimed in claim 1.

* * * * *